(12) United States Patent
Gierach et al.

(10) Patent No.: US 8,290,140 B2
(45) Date of Patent: *Oct. 16, 2012

(54) SOUND EVENT PROCESSING WITH ECHO ANALYSIS

(75) Inventors: Karl Daniel Gierach, Irvine, CA (US); Michael V. Shmalko, Newport Beach, CA (US)

(73) Assignee: Applied Voice & Speech Technologies, Inc., Foothill Ranch, CA (US)

( * ) Notice: Subject to any disclaimer, the term of this patent is extended or adjusted under 35 U.S.C. 154(b) by 211 days.

This patent is subject to a terminal disclaimer.

(21) Appl. No.: 12/881,175

(22) Filed: Sep. 14, 2010

(65) Prior Publication Data

US 2011/0002455 A1 Jan. 6, 2011

Related U.S. Application Data

(63) Continuation of application No. 11/096,004, filed on Mar. 30, 2005, now Pat. No. 7,822,192.

(51) Int. Cl.
*H04M 9/08* (2006.01)

(52) U.S. Cl. ......... 379/406.01; 379/406.03; 379/406.06

(58) Field of Classification Search ................ 379/67.1, 379/68, 77, 78, 81, 88.04, 88.07, 88.08, 202.01–205.01, 379/207.04–207.09, 373.01–373.05, 406.01–406.09; 370/282–290; 381/66, 93, 94.1, 94.3; 455/570
See application file for complete search history.

(56) References Cited

U.S. PATENT DOCUMENTS

| | | | | |
|---|---|---|---|---|
| 5,675,644 A | * | 10/1997 | Sih | 379/406.08 |
| 6,810,116 B1 | * | 10/2004 | Sorensen et al. | 379/202.01 |
| 7,136,471 B2 | * | 11/2006 | Johnson | 379/189 |
| 2002/0172342 A1 | * | 11/2002 | O'Malley et al. | 379/202.01 |
| 2003/0223573 A1 | * | 12/2003 | Tahernezhaadi | 379/406.01 |
| 2005/0262249 A1 | * | 11/2005 | Koskelainen | 709/229 |

* cited by examiner

Primary Examiner — Ahmad Matar
Assistant Examiner — Oleg Asanbayev
(74) Attorney, Agent, or Firm — Anatoly S. Weiser, Esq.; Acuity Law Group

(57) ABSTRACT

Apparatus, methods, and machine-readable articles of manufacture enable a telephone system to distinguish between actual events and echoes. Events may include conferees' voice and DTMF commands. In selected embodiments, the system categorizes an event received on one channel as a real event if the energy of the event's waveform is greater than concurrent energy of every other channel of the same conference. Otherwise, the event is stored. When the system receives a new event of the same type on a channel of the same conference during a predetermined period, it compares the energies of the new and stored events. If the energy of the new event exceeds that of the stored event, the new event becomes the stored event, and the old stored event is ignored. At the end of the period, the stored event is categorized as a real event and forwarded to appropriate application code.

18 Claims, 2 Drawing Sheets ered or DTMF
SOUND EVENT PROCESSING WITH ECHO ANALYSIS

CROSS-REFERENCE TO RELATED APPLICATION

This application is a continuation of and claims priority to U.S. Patent Appl. Ser. No. 11/096,004, entitled SOUND EVENT PROCESSING WITH ECHO ANALYSIS, filed on Mar. 30, 2005, now U.S. Pat. No. 7,822,192. The disclosure of the foregoing patent document is incorporated herein by reference as if fully set forth herein, including Figures, Claims, Tables, and Computer Program Listing Appendix.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates generally to telecommunication systems and methods, and, more particularly, to telephone call management systems and methods for detecting sound commands within sound streams of a telephone conference.

2. Background

Even with the relatively recent proliferation of email, instant messaging, and similar communication technologies, telephone services remain important to an average person or business. Indeed, it appears that the number of individual telephone lines in use is constantly increasing. The number and sophistication of feature functions available from both telephone systems and telephone service providers also continue to increase. Call answering, voice messaging, and automated attendant ("auto attendant") are some of the more popular feature functions commonly offered by telephone systems and service providers.

An auto attendant system typically answers the incoming calls, greets the callers, and transfers the calls to selected extensions. Some auto attendant systems interact with the callers using, for example, dual tone multi-frequency (DTMF or touch-tone) key input. Other auto attendant systems accept voice input, which they process using automatic speech recognition capabilities. Still other systems can receive and process both DTMF and voice input.

A telephone system, such as an auto attendant system, may also enable participants in a telephone conference to issue DTMF or voice commands to the system during a telephone conference. For example, a participant may be able to issue voice or DTMF commands to disconnect from the conference or put the conference on hold. The system would attempt to recognize the keyword or keywords (keyphrase) of the command and the channel of the speaker who uttered the command, and, upon recognition, invoke appropriate application code to perform the command.

Telephone networks are typically terminated by analog or circuit switched trunks that produce audio reflections, also known as echoes. For example, when two or more channels CHN $\{CHN_0, \ldots, CHN_K\}$ are patched via a computer telephony (CT) bus, a small echo signal may be transmitted from each channel to all the other channels involved. On channels $CHN_1$-$CHN_K$, for example, echo from channel $CHN_0$ may be present. As a result, multiple channel-independent signal analysis algorithms that analyze real-time audio data from a particular single channel, such as automatic speech recognition or tone detection algorithms, often produce positive-detect results near-simultaneously. A telephone system may interpret an echo of a keyword uttered or DTMF input sent by a participant at a telephone connected to the channel $CHN_0$ as a keyword uttered or DTMF signal sent by one or more other conference participants connected to the conference via the channels $CHN_1$-$CHN_K$. As a consequence, the system may invoke additional instances of the application code to perform the command corresponding to the echoes of the keyword or DTMF signal. The command may thus be performed multiple times, and affect conference participants who did not issue the command, disrupting the conference.

Mistaking of echoes as actual commands is particularly troublesome when the command that produces the echo is a disconnect signal. Disconnect signals are used in some telephone systems that do not generate loop current drop when a caller hangs up. Instead, these systems typically generate a dial tone-type disconnect signal that is detected by a terminating device, such as an auto attendant system. When a person connected to a multi-party conference from such a system disconnects from the conference, an echo of the disconnect signal may be detected on a channel of another conferee. As a result, the other conferee may also be disconnected from the conference.

It would be desirable to avoid or reduce instances of processing of telephone conference echoes as actual commands.

SUMMARY

A need thus exists for apparatus, methods, and articles of manufacture for recognizing echoes of keywords, commands, and other events in multiple sound streams of a telephone conference. A need also exists for apparatus, methods, and articles of manufacture for reducing instances of processing echoes in telephone conference sound streams as keywords, commands, or other events.

Embodiments of the present invention are directed to methods, apparatus, and articles of manufacture that satisfy one or more of these needs. In some embodiments, the invention herein disclosed is a method of processing sound events in a telephone conference in which a plurality of telephone devices are connected via a plurality of channels, a channel per telephone device. According to this method, events are detected in audio data received from each telephone device of the plurality of telephone devices during the conference, and each event is categorized as a real event or as an echo event based at least in part on one or more of the event's characteristics. When an event is categorized as a real event, code is executed based on type of the real event and telephone device from which the real event originated. The code affects state of a telephone system that connects the plurality of telephone devices in the conference. When an event is categorized as an echo event, the echo event is ignored.

In aspects of the invention, each event is categorized based at least in part on energy level of audio data from which the event was detected.

In aspects of the invention, the method also includes buffering in a separate buffer audio data received from each channel of the plurality of channels during the conference, one channel per buffer, and each event is categorized based at least in part on comparison of energy level of audio data from which the event was detected to energy level of audio data in one or more buffers other than the buffer corresponding to the audio data from which the event was detected.

In aspects of the invention, the one or more characteristics include event type (e.g., a particular voice command, tone command, other telephony signals) and average energy of the audio in the event or in the buffer of the channel on which the event was detected.

In aspects of the invention, the method further includes buffering in a separate buffer audio data received from each telephone device during the conference, one telephone device per buffer, and categorizing is performed as follows:

(1) the event is categorized as an echo event if another event of the same type as the event was categorized as a real event within a first predetermined time period of detection of the event; and (2) the event is categorized as a real event if
(i) the event has not been categorized as an echo event in (1) above,
(ii) energy level of audio data from which the event was detected is greater than energy level of audio data buffered during the event in each buffer other than the buffer corresponding to the audio data from which the event was detected, and
(iii) the energy level of audio data from which the event was detected is not less than energy levels of audio data from which every event of the same type as the event is detected within a second predetermined time period following detection of the event.

In aspects of the invention, at least one of the first predetermined time period and the second predetermined time period may be varied in response to computational load of the telephone system.

These and other features and aspects of the present invention will be better understood with reference to the following description, drawings, and appended claims.

DETAILED DESCRIPTION

Figure 1:
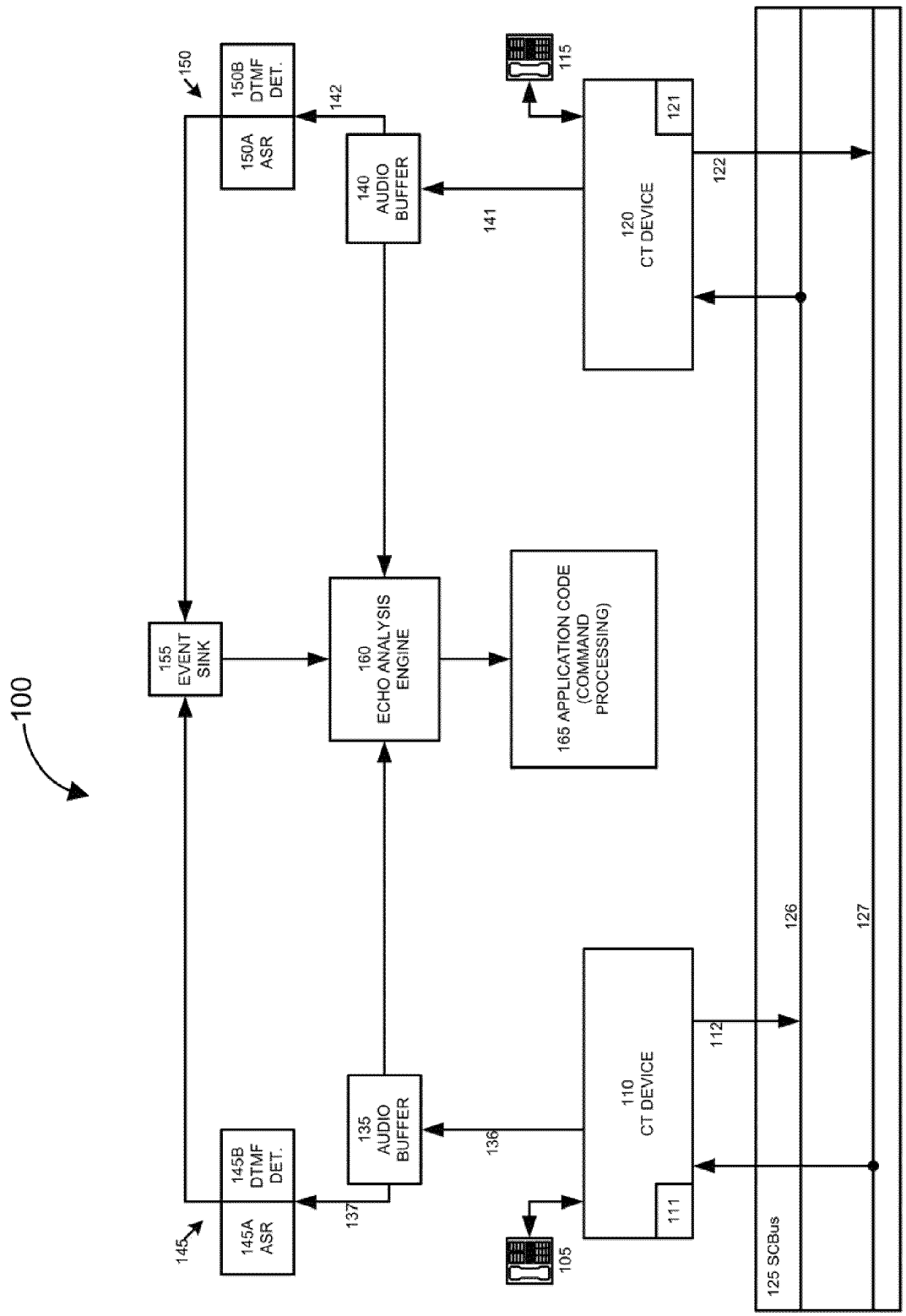
FIG. 1 is a high-level block diagram of a call management system capable of distinguishing between real sound commands from conferees participating in a telephone conference and echoes of the sound commands, in accordance with an embodiment of the present invention.

In this document, the words "embodiment" and "variant" refer to particular apparatus, process, or article of manufacture, and not necessarily to the same apparatus, process, or article of manufacture. Thus, "one embodiment" (or a similar expression) used in one place or context can refer to a particular apparatus, process, or article of manufacture; the same or a similar expression in a different place can refer to a different apparatus, process, or article of manufacture. The expression "alternative embodiment" and similar phrases are used to indicate one of a number of different possible embodiments. The number of possible embodiments is not necessarily limited to two or any other quantity. Characterization of an embodiment as "exemplary" means that the embodiment is used as an example. Such characterization does not necessarily mean that the embodiment is a preferred embodiment; the embodiment may but need not be a currently preferred embodiment. All embodiments are described for illustration purposes and are not strictly limiting.

The words "couple," "connect," and similar expressions with their inflectional morphemes do not necessarily import an immediate or direct connection, but include connections through mediate elements within their meaning.

The word "conference" refers to a telephone conference between two or more participating conferees. A "two-party conference" means a conference between two participating conferees. A "multi-party conference" means a conference with at least three participating conferees. A "conferee" is a person participating in a conference, which can be a two-party or a multi-party conference.

The word "event" refers to an occurrence, in a telephone conference, of sound activity that, when detected by a telephone system that connects the conference's participants, may affect or is intended to affect the state of the telephone system. For example, an event may cause the telephone system to change its current or future connections, receive and store data, send data, or cause other changes in the current or future operation of the telephone system.

Other and further definitions and clarifications of definitions may be found throughout this document. All the definitions are intended to assist in understanding this specification and the appended claims, but the scope and spirit of the invention should not be construed as strictly limited to the definitions, or to the particular examples described in the specification.

The invention herein disclosed can be implemented in a call management system, such as the call management systems described in a patent application entitled APPARATUS AND METHOD FOR PERSONALIZED CALL ACKNOWLEDGEMENT, filed on Sep. 2, 2004, Ser. No. 10/932,745; and in a patent application entitled APPARATUS AND METHOD FOR NOTIFICATION OF A PARTY IN A TELEPHONE CONFERENCE, filed on Nov. 15, 2004, Ser. No. 10/988,809. These commonly-assigned patent applications are incorporated herein by reference in their entirety, including all tables, figures, and claims.

Reference will now be made in detail to several embodiments of the invention that are illustrated in the accompanying drawings. Same reference numerals are used in the drawings and the description to refer to the same apparatus elements and method steps. The drawings are in simplified form, not to scale, and omit apparatus elements and method steps that can be added to the described systems and methods, while including certain optional elements and steps.

FIG. 1 illustrates, in a high-level block diagram manner, a call management system 100 capable of processing tone and voice commands from conferees participating in a telephone conference. A first conferee uses a telephone device 105 to participate in the conference. The telephone device 105 is connected to a computer telephony device 110, for example, a Dialogic® computer telephony board available from Intel corporation. Similarly, a second conferee participates in the conference using a telephone device 115, which is connected to a computer telephony device 120. The computer telephony device 120 can be provided, for example, by the same computer telephony board as the board that hosts the device 110, or by another computer telephony board. Operation of the computer telephony devices 110 and 120 is controlled by application code stored in channel 1 and channel 2 application code memories 111 and 121, respectively. In some embodiments, each of the memories 111 and 121 resides in whole or in part elsewhere within the system 100. Furthermore, if the code of each computer telephony device is the same, a single memory may store the code. The code for the computer telephony devices 110 and 120, and other software of the apparatus and methods described in this document may be stored on and loaded from a machine-readable medium, such as a CD, DVD, flash memory, read-only memory (ROM) semiconductor device, floppy or hard drive, or a similar memory or storage device.

As described above, the computer telephony devices 110 and 120 may be conventional devices designed for use with switched circuit telephone systems. Additionally, the devices 110 and 120 may be virtual devices and may include interfaces capable of using, for example, Internet Protocol (IP), such as Voice over IP (VoIP), or other packet switching network technology to transfer audio data between conference participants. In some embodiments, properties of the computer telephony devices 110 and 120 are as follows:

1. The computer telephony devices simultaneously provide access to "receive" and "transmit" audio streams of individual channels.

2. The computer telephony devices are capable of being coupled (patched) to each other and to other computer telephony devices. A particular device can hear (receive) audio data from telephones connected to other computer telephony devices to which the particular device is patched. In this mode, a first computer telephony device (e.g., device 110) allows access by conferees connected via other computer telephony devices (e.g., via the device 120) to the audio spoken by the conferee at the telephone coupled to the first computer telephony device (e.g., telephone device 105 coupled to the computer telephony device 110). The first computer telephony device also allows its user (e.g., conferee at the telephone device 105) to hear the audio spoken by users connected via other computer telephony devices (e.g., conferee at the telephone device 115).

The telephone devices 105 and 115 (e.g., conventional, cordless, or wireless telephones) can be connected to their respective computer telephony devices 110 and 120 without any intermediate devices; this may be the case if the telephone devices 105 and 115 are part of the system 100 and are located on the same or neighboring premises as the system 100. In a variant of this embodiment, one or both of the telephone devices 105 and 115 are part of the system 100, but are remote to each other. In another variant, one or both telephone devices 105 and 115 are connected to their respective computer telephony devices via a telephone network and appropriate network interfaces, such as a switched telephone network and loop start interfaces, or an IP-based packet network with voice over IP trunk interfaces. Other networks, for example, intranets, extranets, virtual private networks (VPNs), local area network (LANs), wide area network (WANs), enterprise networks, private switched networks, and connection-oriented networks can also be used to connect the telephone devices 105 and 115 to the computer telephony devices 110 and 120 via appropriate interfaces.

An audio bus board 125 provides a communication medium for interconnecting the computer telephony devices 110 and 120. In the illustrated embodiment, the audio bus board 125 is an SCBus-compatible board supporting a framework for patching/connecting together audio channels. The telephone call patching/connecting capability of the board 125 and the devices 110 and 120 will be referred to as the "patching framework." The SCBus is a real-time, high speed, time division multiplexed (TDM) communications bus that provides 1024 time slots (TDM channels) capable of carrying digital information between SCBus-compatible devices. In various embodiments, other communication media capable of supporting the patching framework of digital channels are used for interconnecting the computer telephony devices 110 and 120, including H.100-compatible buses, packet switching interconnections, and other interconnection means. In one embodiment, the audio bus board includes multiplexing software that receives audio from one computer telephony device and redirects the audio to another computer telephony device, using IP/Packet Switching framework. An example of such framework is a Dialogic® Host Media Processing system, which is also available from Intel corporation. It should be noted that the invention need not be construed as limited to implementations based on a specific bus or software.

As illustrated in FIG. 1, the audio bus board 125 includes half duplex dedicated TDM channels 126 and 127. The channel 126 carries audio data from the computer telephony device 110 to the computer telephony device 120. The channel 127 carries audio data between these two devices in the opposite direction. Thus, with respect to the device 110, the channel 126 is a transmit channel, while the channel 127 is a receive or "listen" channel; with respect to the device 120, the channel 127 is a transmit channel, while the channel 126 is a receive channel.

Reference numerals 135 and 140 designate audio buffers associated with the computer telephony devices 110 and 120, respectively. In the illustrated embodiment, each audio buffer 135 and 140 is a circular memory buffer that uses hardware level synchronization via an operating system level API. It contains its own thread of execution dedicated to distributing audio data of its associated channel, i.e., audio data generated at the telephone device associated with the computer telephony device from which the buffer received the audio data. Each circular buffer 135/140 caches a predetermined length of either raw audio or of audio characteristics of the signal appearing on the buffer's associated channel. The audio characteristics may include energy and spectral characteristics. The audio data is dumped to the audio buffers 135/140 via connections 136 and 141 from device driver level threads of the computer telephony devices associated with the buffers, i.e., device 110 driver level thread in case of the buffer 135, and device 120 driver level thread in case of the buffer 140. In some embodiments, each circular buffer stores between 1 and 3 seconds of audio data, continuously overwriting the oldest stored data as new audio data is received.

The audio data can be provided to the buffer 135 in parallel (simultaneously) with the same audio data feeding into the TDM channel 126 via a connection 112. From the buffer 135, the audio data is made available, over a connection 137, to an event detection module (EDM) 145. In the illustrated embodiment, the event detection module 145 includes an automatic speech recognition (ASR) module 145A and a tone detector (a detector of DTMF and other telephony tones) 145B. Similarly, the audio data can be provided to the buffer 140 in parallel with the same audio data feeding into the TDM channel 127 via a connection 122. From the buffer 140, the audio data is made available over a connection 142 to an event detection module 150, which includes an automatic speech recognition module 150A and a tone detector 150B (also a detector of DTMF and other telephony tones). In alternative embodiments, the audio data of a first channel (generated at the telephone device 105) is provided to the event detection module 145 in parallel with the audio buffer 135, while the audio data of a second channel (generated at the telephone device 115) is provided to the event detection module 150 in parallel with the audio buffer 140.

The audio buffers 135/140 and the event detection modules 145/150 may be incorporated into the computer telephony devices with which they are associated, i.e., the buffer 135 and the EDM 145 may reside on the device 110, and the buffer 140 and the EDM 150 may reside on the device 120. Alternatively, the buffers 135/140 and/or the event detection modules 145/150 may be located elsewhere within the system 100.

In a typical conference, the system 100 operates as follows. Audio data from the each conferee leaves the conferee's respective computer telephony device (110 or 120) simultaneously via two separate routes. In the first route, the audio is streamed from an audio streaming API of the first conferee's computer telephony device 110 to the buffer 135, the ASR module 145A, and the tone detector 145B of the same channel. Similarly, audio data from the second conferee is streamed from an audio streaming API of the device 120 to the buffer 140, the ASR module 150A, and the tone detector 150B of the same channel. The second route for each audio data stream is provided by binding the two computer telephony devices 110 and 120 to each other in a full duplex connection via the patching framework of the audio bus board 125, which enables communication via the TDM channels 126 and 127. The TDM channels 126 and 127 carry the audio data of each conferee to the computer telephony device of the other conferee, thus allowing the conferees to hear each other. Note that more than two conferees may participate in the conference. In some embodiments, multiple conferees participate in a conference using a conference resource patched into the framework described above.

Speech recognition is employed to enable the conferees to issue various commands to the system during the conference. For example, each conferee may break the conference patch at any time during the conference by uttering a predetermined command, such as "Seneca®, hold call." Seneca® is a registered mark of an auto attendant system of the assignee of the present invention. It is an easily pronounceable acronym for "Speech ENabled Enterprise Communications Assistant". This word has a low frequency of occurrence within the bounds of common English language usage. It is advantageous to use an infrequently occurring word, such as Seneca®, as a keyword to alert the system 100 to a user command.

When an ASR module (145A or 150A) detects a key phrase command, it issues an event indication and event description to an event sink module 155. Similarly, when a tone detector (145B or 150B) detects DTMF or other tone input, it issues an event indication and description to the event sink module 155. The event sink module 155 registers and classifies the events issued by the event detection modules of the various channels, e.g., event detection modules 145 and 150 of the system 100 of FIG. 1.

Event registration includes recordation of the event and of the time of the event's occurrence or detection. Classification of an event includes association of the event with a particular event type. In the case of voice commands, for example, an event may be a specific command, such as "Seneca®, hold call." In the case of DTMF commands, an event may be a specific tone pair from the DTMF tone set, e.g., simultaneous tones of 697 Hertz and 1209 Hertz representing the digit "1." Event types may further include detection of ASR segment beginning, ASR segment end, other ASR results, all DTMF symbols, dial, disconnect, and other telephony-specific tone patterns. This list is not exclusive.

An echo analysis engine 160 receives the registration and classification information regarding the events from the event sink module 155, and categorizes (characterizes) each event as a "real" event or an "echo" event. A real event is an event that originated from the telephone device of the conference participant connected to the same channel as the channel of the event detection module that detected the event. An echo event is an event that originated from the telephone device of a conference participant connected to a different channel than the channel of the event detection module that detected the event. In other words, an echo event results from a reflection of audio that generates a corresponding real event. Note that the corresponding real event may be generated either before or after the echo event. If the echo analysis engine 160 categorizes an event as a real event, appropriate routines of application code 165 are invoked to perform tasks necessitated by the event. If the echo analysis engine 160 categorizes an event as an echo event, the event is ignored.

The echo analysis engine 160 may be able categorize some or all events substantially in real time, e.g., within about 50 milliseconds of receiving event information. As will be discussed in more detail below, the echo analysis engine 160 may also wait before processing an event in order to receive information regarding similar events from other channels. Limited computing, memory, and storage resources may cause additional processing delays in categorizing events.

To categorize events, the echo analysis engine 160 processes real-time audio and/or audio characteristics available from the buffers 135 and 140. In some embodiments, the echo analysis engine 160 categorizes each event upon receipt based on energy content of the signal that generated the event. For example, events with energy content below a predetermined threshold are categorized as echo events, while events with energy content at or above the predetermined threshold are categorized as real events. As another example, events are categorized based on a ratio R of average energy content during the event to average energy content of the signal of the associated channel over a predetermined time period. If the ratio R falls below a predetermined threshold, the event is categorized as an echo event; otherwise, the event is categorized as a real event.

In some embodiments, the echo analysis engine 160 first categorizes an incoming event as (1) a real event, (2) an echo event, or (3) an ambiguous event. Echo events are ignored and discarded immediately (i.e., without waiting for additional audio data), while real events are immediately sent to the appropriate application code routines, i.e., to the application code routines that perform tasks associated with the events or commands. Ambiguous events continue pending for a period of time while the echo analysis engine 160 receives additional events from the multiple channels of the system 100. In some variants, this "waiting" period is between 100 milliseconds and 3 seconds. In more specific variants, the waiting period is between 250 milliseconds and 2 seconds. In still more specific variants, the waiting period is between 500 milliseconds and 1 second. In some embodiments, the waiting period is adjusted based on the computational load of the processing system. Longer waiting periods are used as the system load increases. The system load may be estimated based on the number of active channels of the system. Other methods may also be used for estimating the system load.

Immediate categorization as a real or an echo event may be performed based on the energy content of the corresponding waveforms in the audio buffers. For example, an event is immediately categorized as a real event if its energy (energy of the waveform from which the event was detected stored in the corresponding buffer) is above energies in each buffer of all other channels connected to the same conference. Similarly, an event may be immediately categorized as an echo event if its average energy is below a predetermined echo threshold. An event that is not immediately categorized as a real or an echo event becomes a pending ambiguous event.

In one embodiment, ambiguous events are processed as follows. Events are stored (1) during a waiting time period of predetermined duration following a first ambiguous event in a series of events of the same type detected by channels connected to the same conference, or (2) until each channel involved in the same conference has detected an event of the same type, whichever comes first. All the events in the series are compared to determine which of the events in the series is the real event. The comparison is performed using an event comparison algorithm of the echo analysis engine 160. When one of the events is determined to be the real event; it is categorized accordingly and passed to the application code 165 for processing. The remaining series events are considered echo events and, therefore, are ignored and discarded. The real event may be selected on the basis of its energy content. For example, the event with the highest average energy content may be selected as the real event.

Figure 2:
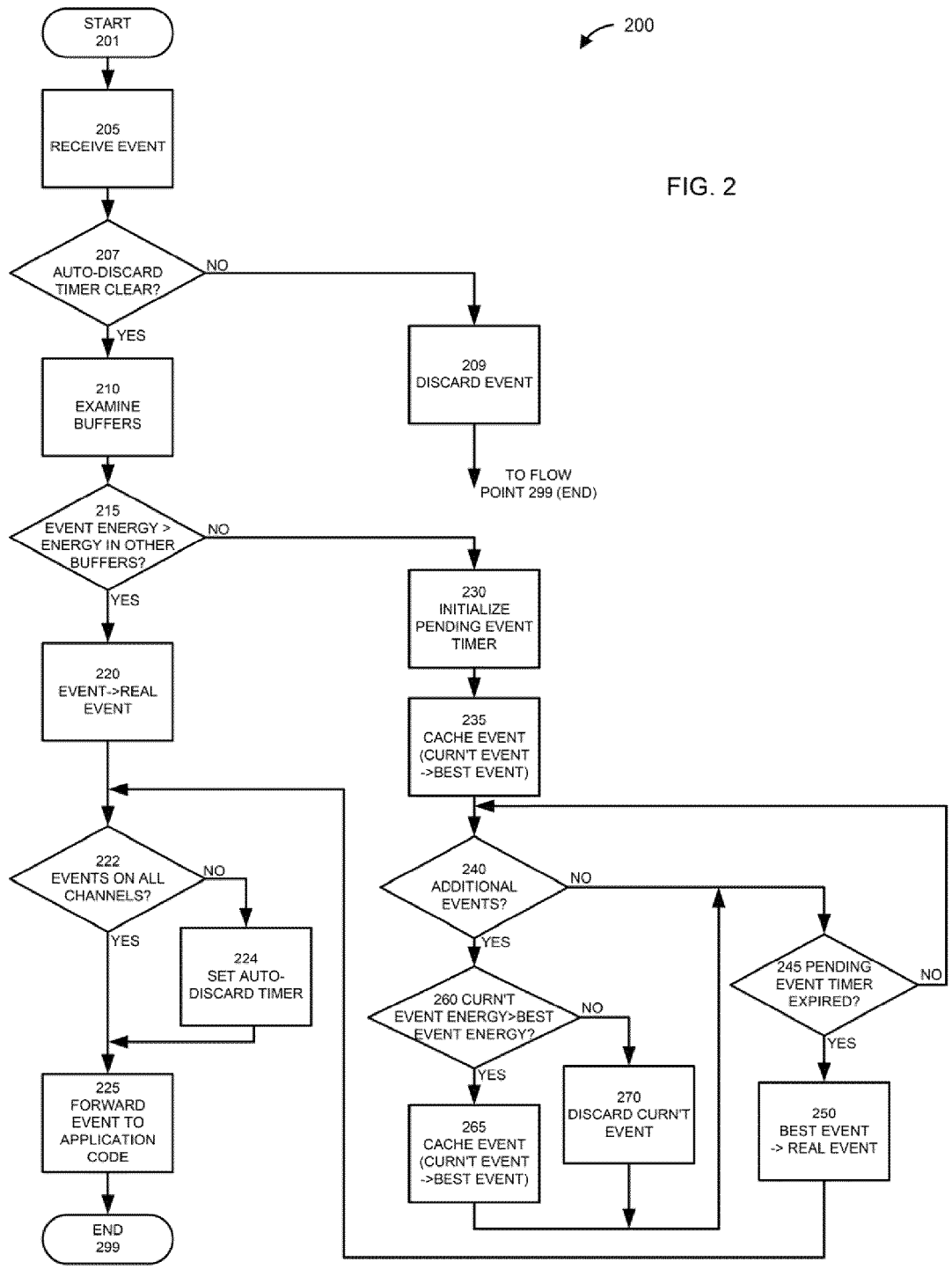
FIG. 2 is a process flow diagram illustrating selected steps of a process for distinguishing between real sound commands from conferees participating in a telephone conference and echoes of the sound commands, in accordance with an embodiment of the present invention.

FIG. 2 illustrates selected steps and decision blocks of a process 200 for categorizing an event as a real or an echo event. Although certain steps and decisions are shown and described serially, some steps can be performed and decisions made by separate elements in conjunction or in parallel, asynchronously or synchronously, in a pipelined manner, or otherwise. There is no particular requirement that the steps be performed and decisions made in the same order in which this description lists them, except where explicitly so indicated, otherwise made clear from the context, or inherently required. Furthermore, not every illustrated step and decision may be required in every embodiment in accordance with the invention, while some steps and decisions that have not been specifically illustrated may be desirable or necessary in some embodiments in accordance with the invention.

In step 205, an event is received from an event detection module. In decision block 207, an auto-discard timer corresponding to the event type of the received event is checked. As will be seen from the discussion below, the auto-discard timer is set when two conditions are satisfied: (1) an event of the same type as the received event is forwarded to application code, and (2) an event of the same type as the forwarded event has not been detected on at least one channel of the conference. The auto-discard timer expires and clears automatically after a predetermined period of time. In some variants, this period is between 100 milliseconds and 3 seconds; in more specific variants, the time period is between 250 milliseconds and 2 seconds; in still more specific embodiments, the period is between 500 milliseconds and 1 second. A cleared auto-discard timer indicates that no event of the same type as the received event has been forwarded to application code within the time period to which this timer is set. Conversely, a set auto-discard timer indicates that an event of the same type as the received event has been forwarded to the application code within that period, and the received event is likely an echo of the forwarded event. In the latter case, process flow advances to step 209, discarding the received echo event, and the process terminates at flow point 299.

If the auto discard timer is clear, process flow proceeds to step 210, where energies of each audio buffer of all the channels in the conference are examined, including energy in the audio buffer of the channel that detected the event. In decision block 215, the energy of the waveform in the audio buffer of the channel that detected the event is compared to the energies in all the other audio buffers of the channels in the conference.

If the energy in the audio buffer of the channel that detected the event is greater than the energy in each other audio buffer of the channels in the conference, process flow proceeds to step 220, in which the event is categorized as a real event. From the step 220, process flow proceeds to decision block 222, to check whether events of the same type as the received event are presently detected on all the channels of the conference. If events of the same type have indeed been detected on each conference channel, process flow advances to step 225, forwarding the event to the appropriate application code routines. The process 200 then terminates at the flow point 299. If an event of the same type has not been detected on at least one of the conference channels, process flow proceeds to step 224 to set the auto-discard timer. Process flow then advances to the step 225, forwarding the event to the appropriate application code, and the process terminates at the flow point 299.

Let us now return to the decision block 215. If the energy in the audio buffer of the channel that detected the event is not greater than the energy in at least one other audio buffer of the channels in the conference, process flow proceeds to step 230 to initialize a waiting or pending event timer. As has been mentioned earlier, in some variants the pending event timer is set to expire after a time period of between 100 milliseconds and 3 seconds; in more specific variants, the pending event timer is set to expire after a time period of between 250 milliseconds and 2 seconds; in still more specific variants, the pending timer is set to expire after a time period of between 500 milliseconds and 1 second.

In step 235, which follows the step 230, the current event is cached as the best event, i.e., highest energy event of the same type. Next, the system checks for presence of additional events of the same type on all other channels connected to the same conference. This is done in decision block 240. If no such events are found, the pending event timer is checked in decision block 245. If the pending event timer has not expired, process flow returns to the input of the decision block 240. If the pending event timer has expired, process flow proceeds to step 250, to categorize the best event as a real event After the step 250, process flow advances to the input of the decision block 222, and proceeds from there as has already been described, terminating at the flow point 299.

In a variant of this embodiment, the decision block 245 also checks whether events of the same type have been received for all the channels connected to the same conference since the pending event timer was initialized. According to this variant, process flow continues to step the 250 if the pending event timer has expired or events for all the channels have been received; process flow returns to the input of the decision block 240 if either of the two conditions is not satisfied.

Returning to the decision block 240, when the determination made in this block indicates that a new event of the same type has been detected by another channel, process flow advances to decision block 260 to compare the energy corresponding to the new event with the energy of the best event. If the new event has higher energy than the best event, process flow proceeds to step 265 to cache the new event as the best event. Process flow then proceeds to the decision block 245, to determine whether the pending event timer has expired. If the energy of the new event is not higher than the energy of the best event, process flow advances to step 270, discarding the new event. After the new event is discarded, process flow continues to the decision block 245.

To recapitulate briefly, the process 200 categorizes a first event as an echo if its average energy is less then the energy of another channel that produced the same type of event slightly earlier. The first event is categorized as a real event if its energy is greater than the energy of each other channel connected to the conference, regardless of received event types and data. In the case where the first event's energy is less than the energy of at least one of the other channels of the same conference and the event detection module of the channel with the higher energy has not yet detected an event, the decision making (categorization) for the first channel's event is delayed via a pending event timer mechanism. The pending event timer mechanism allows an echo analysis engine to compare the event to events from other channels received within a predetermined time period, e.g., between 100 milliseconds and 3 seconds. An event of the same type received during this time period is categorized as a real event if it has the highest energy of all the events of the same type received during the period.

The method 200 processes events of a single type, for example, a command such as "Seneca®, hold call," other ASR results, DTMF symbols, or other tone patterns. Two or more instances of the process 200 may operate simultaneously, however, with each instance categorizing events of the same or a different type.

While in the embodiments described above categorization of events is based on energy levels of the audio waveforms, this need not always be the case. In other embodiments, other audio characteristics may be analyzed instead of or in addition to the energy content of the audio waveforms. For example, correlation of conditioned waveforms of different events may be analyzed to determine whether one of the events is an echo of another event. Waveforms may be conditioned by time and level shifting in order to adjust for unequal delays and bring the waveforms to approximately the same power level. Using this technique, two events of the same type that occur in close time proximity of each other may both be categorized as real events. For example, when two conferees issue the same voice command at about the same time, the system would be able to distinguish between the two commands based on the actual audio patterns, categorize both command events as real events, and process both commands.

The above specification describes in considerable detail the inventive apparatus, methods, and articles of manufacture for processing sound events during a telephone conference. This was done for illustration purposes only. Neither the specific embodiments of the invention as a whole, nor those of its features limit the general principles underlying the invention. The specific features described herein may be used in some embodiments, but not in others, without departure from the spirit and scope of the invention as set forth. Various physical arrangements of components and various step sequences also fall within the intended scope of the invention. The invention may be used in two-party and multi-party conferences. Many additional modifications are intended in the foregoing disclosure, and it will be appreciated by those of ordinary skill in the art that in some instances some features of the invention will be employed in the absence of a corresponding use of other features. The illustrative examples therefore do not define the metes and bounds of the invention and the legal protection afforded the invention, which function is carried out by the claims and their equivalents.

We claim:

1. A method of processing events in a telephone conference in which a plurality of telephone devices are connected via a plurality of channels, a channel per telephone device, the method comprising:
    detecting real and echo events in audio data received from each telephone device of the plurality of telephone devices during the conference, thereby obtaining detected events;
    categorizing each detected event in a real event category or in an echo event category based at least in part on one or more characteristics of said each detected event;
    in response to said each detected event being categorized in the real event category, executing code based on type of said each detected event and the telephone device from which said each detected event originated, execution of the code changing state of a telephone system that connects the plurality of telephone devices in the conference; and
    in response to said each detected event being categorized in the echo event category, ignoring said each detected event;
    wherein the type of said each detected event is selected from a group consisting of (i) event types that cause a telephone system that connects the plurality of telephone devices in the telephone conference to change current or future connections, (ii) event types that cause the telephone system that connects the plurality of telephone devices in the telephone conference to receive and store data, and (iii) event types that cause the telephone system that connects the plurality of telephone devices in the telephone conference to send data.

2. A method according to claim 1, wherein said each detected event is a command of a participant of the telephone conference or a change made by the participant in one or more connections of the conference.

3. A method according to claim 2, further comprising:
    buffering in a separate buffer the audio data received from each channel of the plurality of channels during the conference, one channel per buffer;
    wherein the step of categorizing comprises:
    categorizing said each detected event based at least in part on comparison of energy level of the audio data from which said each detected event was detected to energy level of the audio data in a buffer other than the buffer corresponding to the audio data from which said each detected event was detected.

4. A method according to claim 2, further comprising:
    buffering in a separate buffer the audio data received from each channel of the plurality of channels during the conference, one channel per buffer;
    wherein the step of categorizing comprises:
    categorizing said each detected event based at least in part on comparison of energy level of the audio data from which said each detected event was detected to energy level of the audio data in each buffer other than the buffer corresponding to the audio data from which said each detected event was detected.

5. A method according to claim 2, further comprising:
    buffering in a separate buffer the audio data received from said each telephone device during the conference, one telephone device per buffer;
    wherein the step of categorizing comprises:
      (1) categorizing said each detected event in the echo event category if another detected event of the same type as said each detected event was categorized in the real event category within a first predetermined time period of detection of said each detected event; and
      (2) categorizing said each detected event in the real event category if (i) said each detected event has not been categorized in the echo event category in step (1), (ii) energy level of the audio data from which said each detected event was detected is greater than energy level of the audio data buffered during said each detected event in each buffer other than the buffer corresponding to the audio data from which said each detected event was detected, and (iii) the energy level of the audio data from which said each detected event was detected is not less than energy levels of the audio data from which every detected event of the same type as said each detected event is detected within a second predetermined time period following detection of said each detected event.

6. A method according to claim 5, further comprising:
varying at least one of the first predetermined time period and the second predetermined time period in response to computational load of the telephone system.

7. A method according to claim 1, wherein said each detected event is selected from a group consisting of a tone command of a participant of the telephone conference, a voice command of the participant of the telephone conference, and a change made by the participant in a connection of the participant to the conference.

8. A method according to claim 1, wherein the plurality of telephone devices comprises at least three telephone devices.

9. A method of processing events in a telephone conference in which a plurality of telephone devices are connected through a plurality of channels, a channel per telephone device, the method comprising:
 buffering in a separate circular buffer audio data received through each channel;
 detecting real and echo events in the audio data received through each channel during the conference, thereby obtaining detected events;
 determining types of the detected events, wherein the types of the detected events are selected from a group consisting of (i) event types that cause a telephone system that connects the plurality of telephone devices in the telephone conference to change current or future connections, (ii) event types that cause the telephone system to receive and store data, and (iii) event types that cause the telephone system to send data;
 using one or more event characteristics to categorize a first detected event detected from the first audio data received through a first channel of the plurality of channels in a real event category or in an echo event category;
 in response to the first detected event being categorized in the real event category, executing code based at least in part on type of the first detected event, execution of the code changing state of a telephone system that connects the plurality of telephone devices in the conference; and
 in response to the first detected event being categorized in the echo event category, ignoring the first detected event.

10. A method according to claim 9, wherein said each detected event is a command of a participant of the telephone conference or a change made by the participant in one or more connections of the conference.

11. A method according to claim 9, wherein the one or more event characteristics include average energy levels in each of the buffers.

12. A method according to claim 9, wherein the step of using comprises:
 (1) categorizing the first detected event in the echo event category if another detected event of the same type as the first detected event was categorized in the real event category within a first predetermined time period of detection of the first detected event;
 (2) categorizing the first detected event in the real event category if (i) no other detected event of the same type as the first detected event was categorized in the real event category within the first predetermined time period of detection of the first detected event, (ii) average energy level of the audio data in the buffer of the first channel is not less than average energy level of the audio data in buffer of each other channel, and (iii) the average energy level of the audio data in the buffer of the first channel is not less than average energy level of the audio data in buffer of each other channel that causes detection of a event of the same type as the first detected event within a second predetermined time period of detection of the first detected event; and
 (3) categorizing the first detected event in the echo category if the first detected event was not categorized in the real event category in step (2).

13. A method of processing events in a telephone conference in which a plurality of telephone devices are connected through a plurality of channels, a channel per telephone device, the method comprising:
 detecting events in audio data received through each channel during the conference, thereby obtaining detected events;
 determining types of the detected events, wherein the types of the detected events are selected from a group consisting of (i) event types that cause a telephone system that connects the plurality of telephone devices in the telephone conference to change current or future connections, (ii) event types that cause the telephone system to receive and store data, and (iii) event types that cause the telephone system to send data;
 using one or more event characteristics to categorize the detected events in a real event category or in an echo event category;
 in response to categorization of a detected event in the real event category, executing code based at least in part on a type of the detected event, execution of the code changing state of a telephone system that connects the plurality of telephone devices in the conference; and
 ignoring detected events categorized in the echo event category.

14. A method according to claim 13, wherein the types comprise tone events.

15. A method according to claim 13, wherein the types comprise disconnect signaling.

16. A telephone system comprising:
 a plurality of computer telephony devices;
 a plurality of trunk interfaces configured to connect to a plurality of telephone devices through a plurality of channels, a channel per telephone device, each trunk interface of the plurality of trunk interfaces being coupled to a computer telephony device of the plurality of computer telephony devices;
 an audio bus board coupled to each computer telephony device of the plurality of computer telephony devices;
 means for connecting two or more of the trunk interfaces in a telephone conference;
 means for buffering in separate circular buffers the audio data received through each of the two or more trunk interfaces;
 means for detecting events in the audio data received through each of the two or more trunk interfaces during the conference, thereby obtaining detected events;
 means for determining types of the detected events, wherein the types of the detected events are selected from a group consisting of (i) event types that cause the telephone system to change current or future connections, (ii) event types that cause the telephone system to receive and store data, and (iii) event types that cause the telephone system to send data;

means for using one or more event characteristics to categorize the detected events, each detected event being categorized in a real event category or in an echo event category;

means for executing, in response to categorization of a detected event in the real event category, instructions based at least in part on type of the detected event, execution of the instructions changing state of the telephone system; and means for discarding detected events categorized in the echo event category.

17. A telephone system according to claim 16, wherein each of the detected events is a command of a participant of the telephone conference or a change made by the participant in one or more connections of the conference.

18. A telephone system according to claim 16, wherein the audio bus board comprises a time division multiplexed communications bus with a plurality of TDM channels, and the plurality of computer telephony devices comprises at least three computer telephony devices.

* * * * *